(12) United States Patent
Wu

(10) Patent No.: US 7,839,469 B2
(45) Date of Patent: Nov. 23, 2010

(54) COLOR FILTER SUBSTRATE, METHOD FOR MANUFACTURING THE SAME AND LIQUID CRYSTAL DISPLAY PANEL USING THE SAME

(75) Inventor: Biing-Seng Wu, Tainan (TW)

(73) Assignee: Chimei Innolux Corporation, Miaoli County (TW)

( * ) Notice: Subject to any disclaimer, the term of this patent is extended or adjusted under 35 U.S.C. 154(b) by 203 days.

(21) Appl. No.: 12/167,545

(22) Filed: Jul. 3, 2008

(65) Prior Publication Data
US 2009/0009699 A1    Jan. 8, 2009

(30) Foreign Application Priority Data
Jul. 4, 2007    (TW) .............................. 96124376 A

(51) Int. Cl.
*G02F 1/1335* (2006.01)
(52) U.S. Cl. ........................ 349/106; 349/110; 349/111; 430/7
(58) Field of Classification Search ................. 349/104, 349/106, 110, 111; 430/7; 359/891; 264/1.1
See application file for complete search history.

(56) References Cited

U.S. PATENT DOCUMENTS

| 5,850,271 | A | * | 12/1998 | Kim et al. | .................... 349/111 |
| 7,547,494 | B2 | * | 6/2009 | Zhan | .............................. 430/7 |
| 7,695,874 | B2 | * | 4/2010 | Huang et al. | ................... 430/7 |
| 2005/0195350 | A1 | * | 9/2005 | Lai | ............................. 349/137 |
| 2006/0146235 | A1 | * | 7/2006 | Oh et al. | ..................... 349/106 |

* cited by examiner

*Primary Examiner*—Hemang Sanghavi
(74) *Attorney, Agent, or Firm*—Thomas, Kayden, Horstemeyer & Risley, LLP

(57) ABSTRACT

A color filter substrate, a method for manufacturing the same, and a liquid crystal display (LCD) panel using the same are provided. The color filter substrate includes a base material, a filter structure, and a common electrode layer. The filter structure includes a sheltering matrix and a plurality of color filter layers. The sheltering matrix disposed above the base material includes a black resin layer and a conducting material layer. The black resin layer has a plurality of openings for exposing a partial surface of the base material. The conducting material layer is disposed on the black resin layer. The color filter layers are disposed in the plurality of openings of the black resin layer. The common electrode layer is disposed on the filter structure.

9 Claims, 5 Drawing Sheets

US 7,839,469 B2

COLOR FILTER SUBSTRATE, METHOD FOR MANUFACTURING THE SAME AND LIQUID CRYSTAL DISPLAY PANEL USING THE SAME

This application claims the benefit of Taiwan application Serial No. 96124376, filed Jul. 4, 2007, the subject matter of which is incorporated herein by reference.

BACKGROUND OF THE INVENTION

1. Field of the Invention

The invention relates in general to a color filter substrate and a method for manufacturing the same and a liquid crystal display (LCD) panel using the same, and more particularly to a color filter substrate capable of reducing sheet resistance, a method for manufacturing the same, and a liquid crystal display (LCD) panel using the same.

2. Description of the Related Art

Liquid crystal display (LCD) panels are used in portable products such as personal digital assistant (PDA) and cellular phone, and the demand for LCD panels is ever increasing. Thus, the manner of producing high-quality a on the screen of portable products or projection TV has become an important issue to the manufacturers.

FIG. 1 shows a diagram showing an exploded view of a conventional LCD panel 100. The LCD panel 100 includes a color filter substrate 120, a thin film transistor (TFT) substrate 110 and a liquid crystal layer (not illustrated in the diagram) disposed between the color filter substrate 120 and the TFT substrate 110. The color filter substrate 120 includes a base material 130, a common electrode layer 150 and a filter structure 140. The filter structure 140 disposed above the base material 130 includes a sheltering matrix 142 and a plurality of color filter layers 141. The sheltering matrix 142 has a plurality of openings 142a for exposing a partial surface of the base material 130. The color filter layers 141 are disposed in the openings 142a. The common electrode layer 150 is disposed on the filter structure 140. The TFT substrate 110 has a plurality of TFTs 111 opposite to a portion of the sheltering matrix 142.

As is known, the common electrode layer 150, disposed on the sheltering matrix 142, is generally made from indium tin oxide (ITO), which does not have good conductive qualities. As the common electrode layer 150 is entirely coated on the base material 130, the common electrode layer 150 has higher sheet resistance, thereby affecting the display effect of the LCD panel.

SUMMARY OF THE INVENTION

Embodiments of the invention are directed to a color filter substrate and a method for manufacturing the same and a liquid crystal display (LCD) panel using the same. The common electrode layer directly contacts the conducting material layer so that the sheet resistance is reduced.

According to a first embodiment of the present invention, a color filter substrate, including a base material, a filter structure, and a common electrode layer, is provided. The filter structure includes a sheltering matrix and a plurality of color filter layers. The sheltering matrix is disposed above the base material includes a black resin layer and a conducting material layer. The black resin layer has a plurality of openings for exposing a partial surface of the base material. The conducting material layer is disposed on the black resin layer. The color filter layers are disposed in the plurality of openings of the black resin layer. The common electrode layer is disposed on the filter structure.

According to a second embodiment of the present invention, a liquid crystal display (LCD) panel, including a thin film transistor (TFT) substrate, a color filter substrate and a liquid crystal layer, is provided. The TFT substrate has a plurality of TFTs. The color filter substrate includes a base material, a filter structure and a common electrode layer. The filter structure further includes a sheltering matrix and a plurality of color filter layers. The sheltering matrix disposed above the base material includes a black resin layer and a conducting material layer. The black resin layer has a plurality of openings for exposing a partial surface of the base material. The conducting material layer is disposed on the black resin layer. The color filter layers are disposed in the plurality of openings of the black resin layer. The common electrode layer is disposed on the filter structure. The liquid crystal layer is disposed between the TFT substrate and the color filter substrate.

According to a third embodiment of the present invention, a method for manufacturing color filter substrate is provided. Firstly, a base material is provided. Next, a black resin layer is formed above the base material, wherein the black resin layer has a plurality of openings for exposing a partial surface of the base material. Then, a conducting material layer is formed on the black resin layer. After that, a plurality of color filter layers is formed in the plurality of openings of the black resin layer to complete the filter structure. Lastly, a common electrode layer is formed on the conducting material layer and the color filter layers.

The invention will become apparent from the following detailed description of the preferred but non-limiting embodiments. The following description is made with reference to the accompanying drawings.

DETAILED DESCRIPTION OF THE INVENTION

A color filter substrate and a method for manufacturing the same and a liquid crystal display (LCD) panel using the same are provided to address and reduce sheet resistance.

The following embodiments are for elaboration purposes only, and should not be construed as limiting on the scope and spirit of the invention. Moreover, certain technical details are omitted from the discussion provided herein for purposes of better illustrating certain inventive features.

First Embodiment

Figure 1:
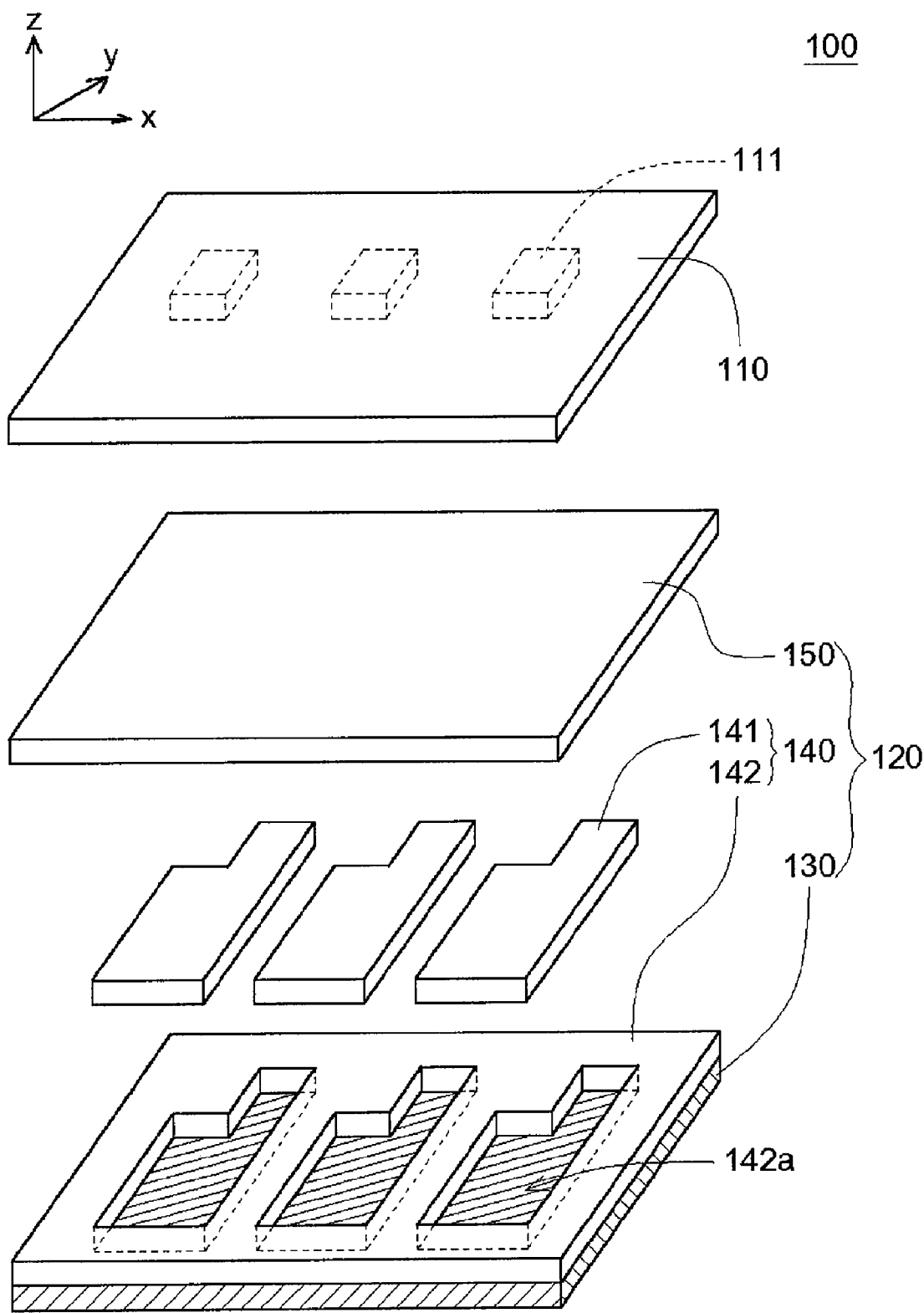
FIG. 1 (Prior Art) is a diagram showing an exploded view of a conventional LCD panel.
Figure 2:
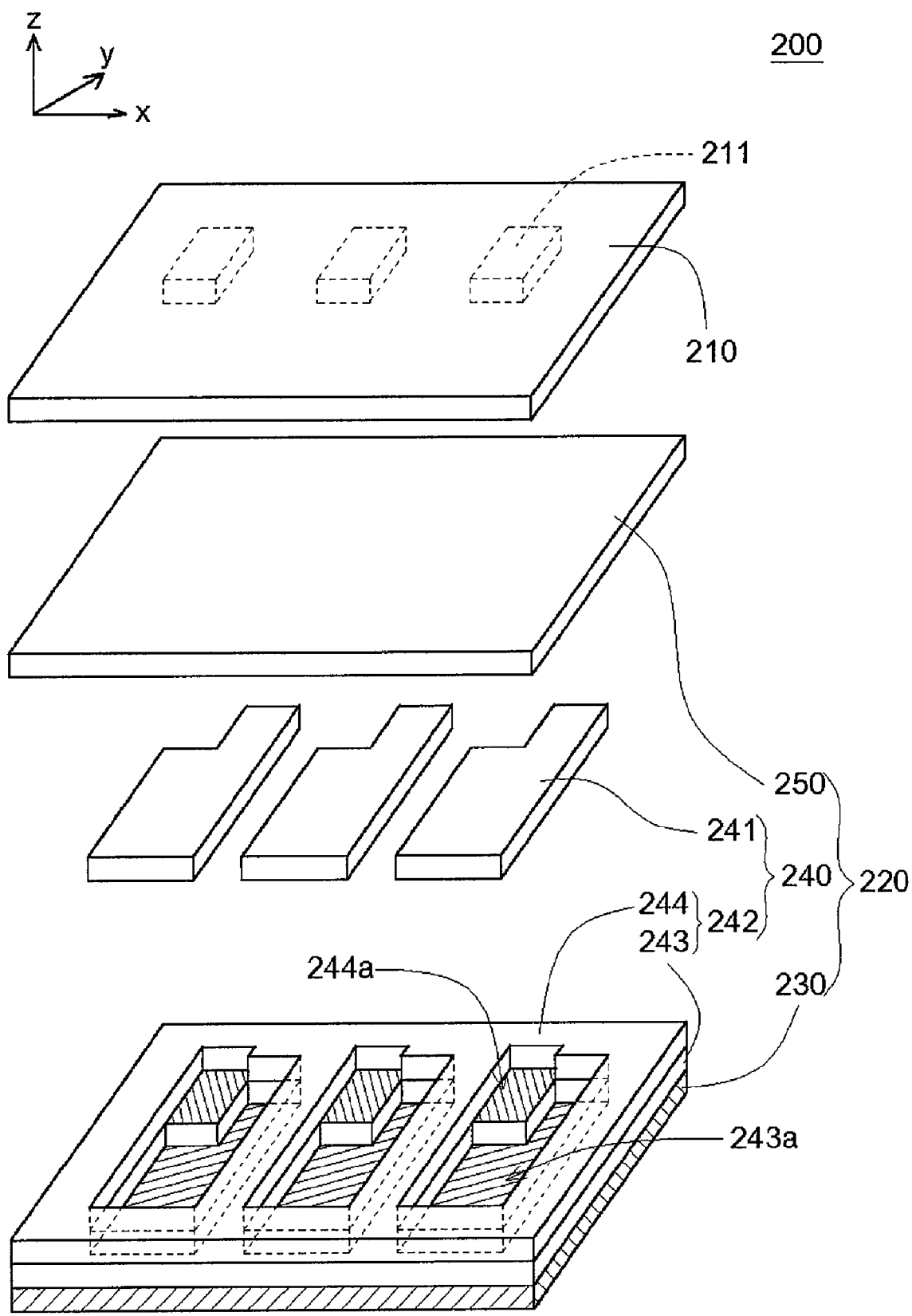
FIG. 2 is a diagram showing an exploded view of an LCD panel according to a first embodiment of the invention.

One embodiment of the invention is directed to a color filter substrate and an LCD panel using the same. Reference is made to FIG. 2, which shows an exploded diagram of an LCD panel 200 according to a first embodiment of the invention. The LCD panel 200 includes a thin film transistor (TFT) substrate 210, a color filter substrate 220 and a liquid crystal layer (not illustrated in the diagram). The TFT substrate 210 has a plurality of TFTs 211. The liquid crystal layer is disposed between the TFT substrate 210 and the color filter substrate 220. The color filter substrate 220 includes a base material 230, a filter structure 240 and a common electrode layer 250. The filter structure 240 includes a sheltering matrix 242 and a plurality of color filter layers 241. The sheltering matrix 242 is disposed above the base material 230 for blocking the light. The sheltering matrix 242 includes a black resin layer 243 and a conducting material layer 244. The black resin layer 243 has a plurality of openings 243a for exposing a partial surface of the base material 230. The conducting material layer 244 is disposed on the black resin layer 243. The color filter layers 241 are disposed in the openings 243a of the black resin layer 243 so that the light can pass through the color filter layers 241 to be colored. The common electrode layer 250 is disposed on the filter structure 240. The common electrode layer 250 directly contacts the conducting material layer 244 so that the conducting area is increased and the sheet resistance of the LCD panel 200 is decreased.

Furthermore, the conducting material layer 244 can be made from chromium or aluminum. However, the conducting material layer 244 can be made from other conductive metals as well. In the present embodiment, the common electrode layer 250 is made from indium tin oxide (ITO). However, other conductive materials can also be used. In addition, the base material 230 is preferably a transparent glass substrate so that the light can pass through the base material 230.

In the illustrated embodiment, the conducting material layer 244 is disposed on the part of black resin layer 243 not opposite to the TFT 211, so that the part of the conducting material layer 244 opposite to the TFT 211 forms a plurality of gaps 244a for exposing a portion of the black resin layer 243. As will be appreciated, current leakage occurs when the light reflecting from the conducting material layer 244 acts on the TFT 211. Thus, current leakage will be significantly reduced since the part of the conducting material layer 244 opposite to the TFT 211 is removed.

Figure 3:
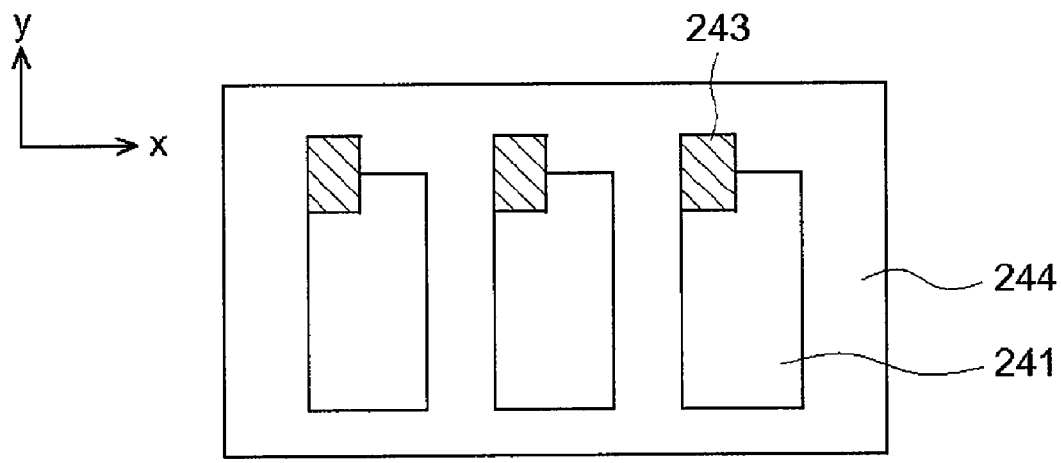
FIG. 3 shows a top view of the color filter substrate of FIG. 2.

FIG. 3 shows a top view of the color filter substrate 220 of FIG. 2. The conducting material layer 244 covers the part of the black resin layer 243 not opposite to the TFT 211 (as indicted in FIG. 2), and a portion of the black resin layer 243 is exposed from the gap 244a of the conducting material layer 244, thus current leakage will not occur since the light will not act on the TFT.

Figure 4:
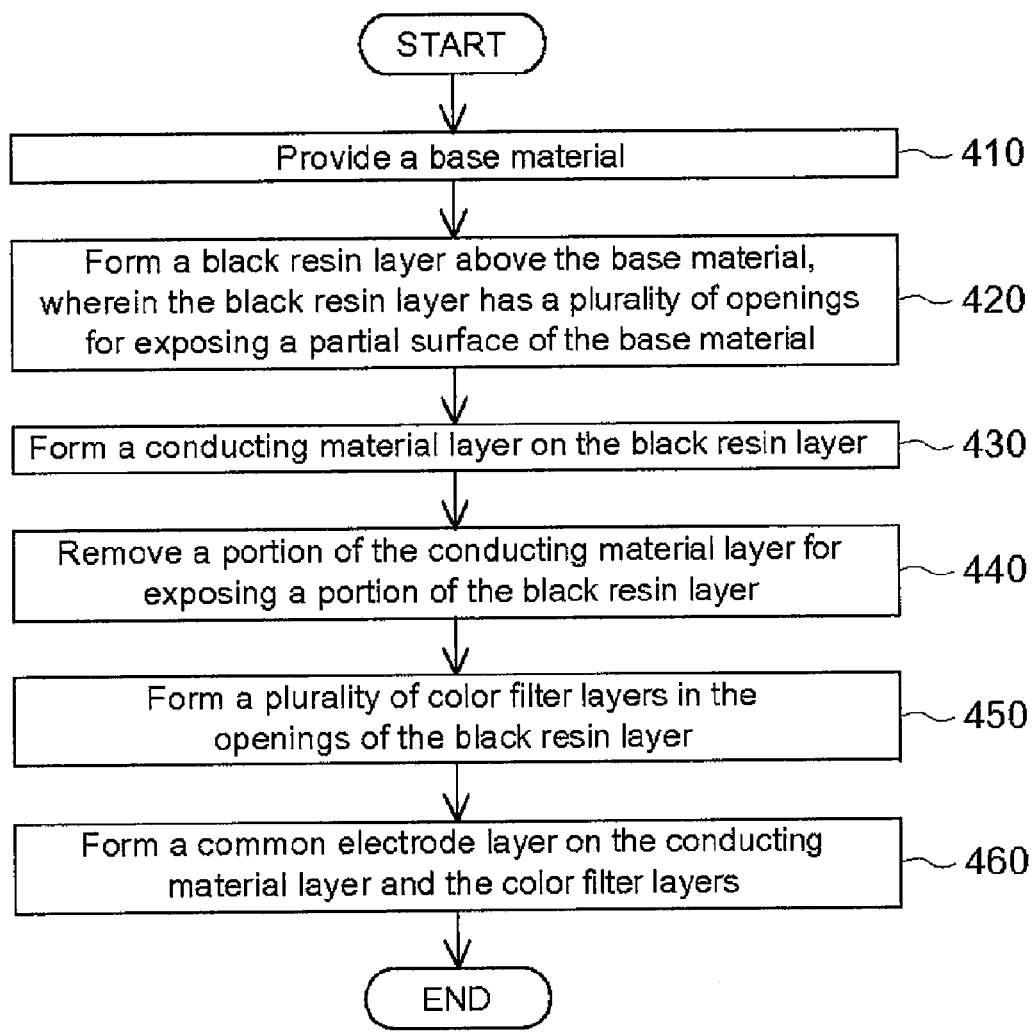
FIG. 4 shows a flowchart of a method for manufacturing the color filter substrate of FIG. 2.

A method for manufacturing color filter substrate is described below in connection with the accompanying flowchart. Referring to both FIG. 2 and FIG. 4. FIG. 4 shows a flowchart of a method for manufacturing the color filter substrate of FIG. 2. First, a base material 230 is provided (step 410). Next, a black resin layer 243 is formed on the base material 230 (step 420), wherein the black resin layer 243 has a plurality of openings 243a for exposing a partial surface of the base material 230. Then, a conducting material layer 244 is formed on the black resin layer 243 (step 430). After that, a portion of the conducting material layer 244 is removed for exposing a portion of the black resin layer 243 (step 440).

In the present embodiment, the part of the conducting material layer 244 opposite to the TFT 211 is removed, so that the light will not act on the TFT 211. Then, a plurality of color filter layers 241 are formed in the openings of 243a of the black resin layer 243 (step 450). Lastly, a common electrode layer 250 is formed on the conducting material layer 244 and the color filter layers 241 (step 460).

The LCD panel 200 has the following characteristics. The part of the conducting material layer 244 opposite to the TFT 211 has a plurality of gaps 244a for exposing portions of the black resin layer 243 so that the black resin layer 243 can effectively shield the TFT 211.

Second Embodiment

Figure 5:
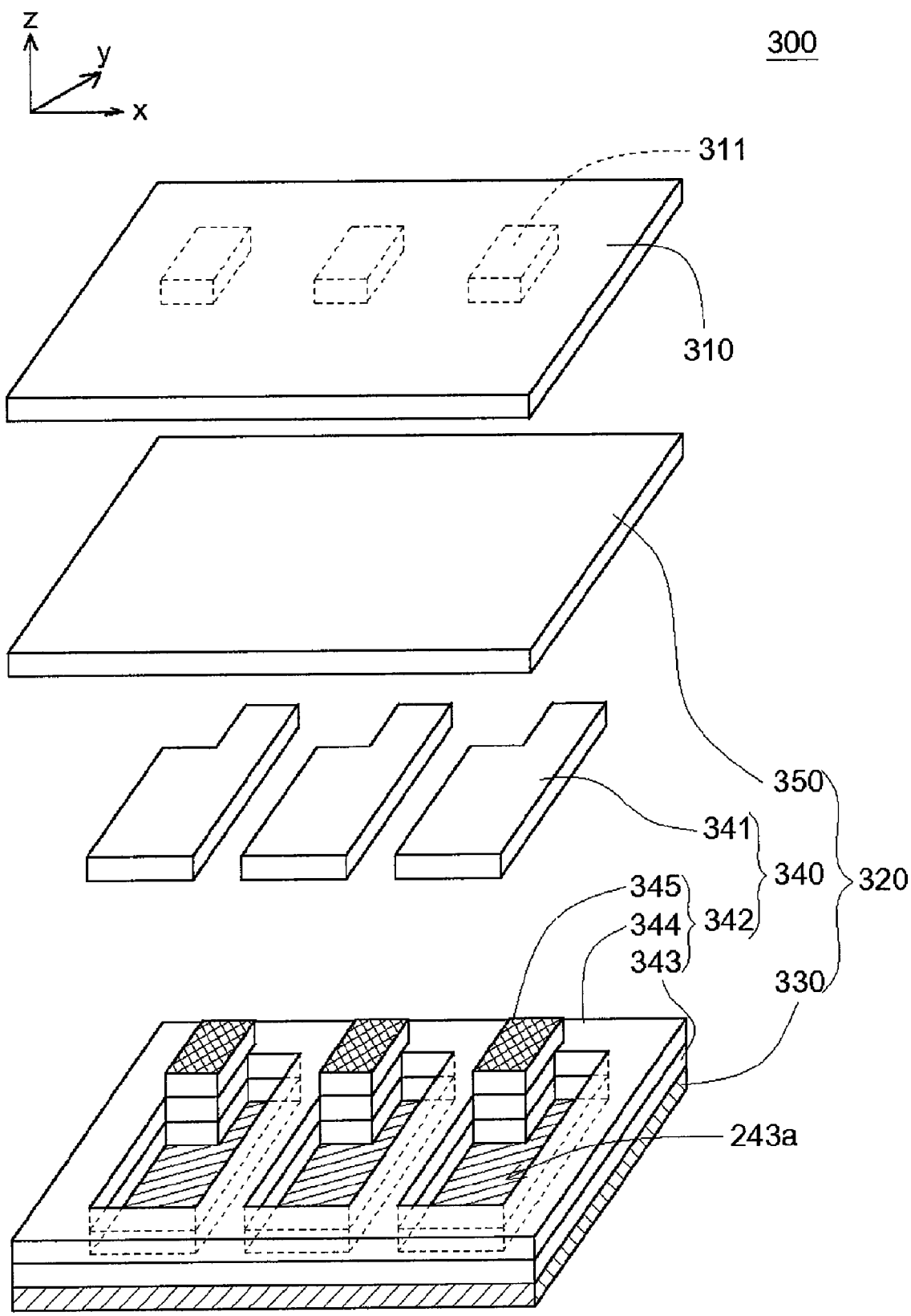
FIG. 5 is a diagram showing an exploded view of an LCD panel according to a second embodiment of the invention.

Reference is made to FIG. 5, which is a diagram of an exploded view of an LCD panel 300 constructed according to a second embodiment of the invention. The LCD panel 300 includes a TFT substrate 310, a color filter substrate 320 and a liquid crystal layer (not illustrated in the diagram). The TFT substrate 310 has a plurality of TFTs 311. The liquid crystal layer is disposed between the TFT substrate 310 and the color filter substrate 320. The color filter substrate 320 includes a base material 330, a filter structure 340 and a common electrode layer 350. The filter structure 340 includes a sheltering matrix 342 and a plurality of color filter layers 341. The sheltering matrix 342 is disposed above the base material 330 for blocking the light. The sheltering matrix 342 includes a black resin layer 343, a conducting material layer 344 and an anti-reflection layer 345. The black resin layer 343 has a plurality of openings 343a for exposing a partial surface of the base material 330. The conducting material layer 344 is disposed on the black resin layer 343. The anti-reflection layer 345 is disposed on the conducting material layer 344 and disposed opposite to the TFT 311 for shielding from the light directly reflecting to the TFT 311. The color filter layers 341 are disposed in the openings 343a of the black resin layer 343 so that the light can pass through the color filter layers 341 and be colored. The common electrode layer 350 is disposed on the filter structure 340 and directly contacts the conducting material layer 344, so that the conducting area is increased and the sheet resistance of the LCD panel 300 is correspondingly decreased.

As will be appreciated by persons skilled in the art, current leakage occurs when the light reflecting from the conducting material layer 344 acts on the TFT 311. Thus, current leakage, therefore, will be reduced, since an anti-reflection layer 345 is formed on the part of the conducting material layer 344 opposite to the TFT 311. The anti-reflection layer 345 is preferably made from chromium oxide or other anti-reflective materials.

Furthermore, the conducting material layer 344 can also be made from chromium, aluminum or other conductive metals. In the present embodiment, the common electrode layer 350 is made from indium tin oxide (ITO). However, other suitable conductive materials can also be used. In addition, the base material 330 is preferably a transparent glass substrate, so that the light can pass through the base material 330.

Figure 6:
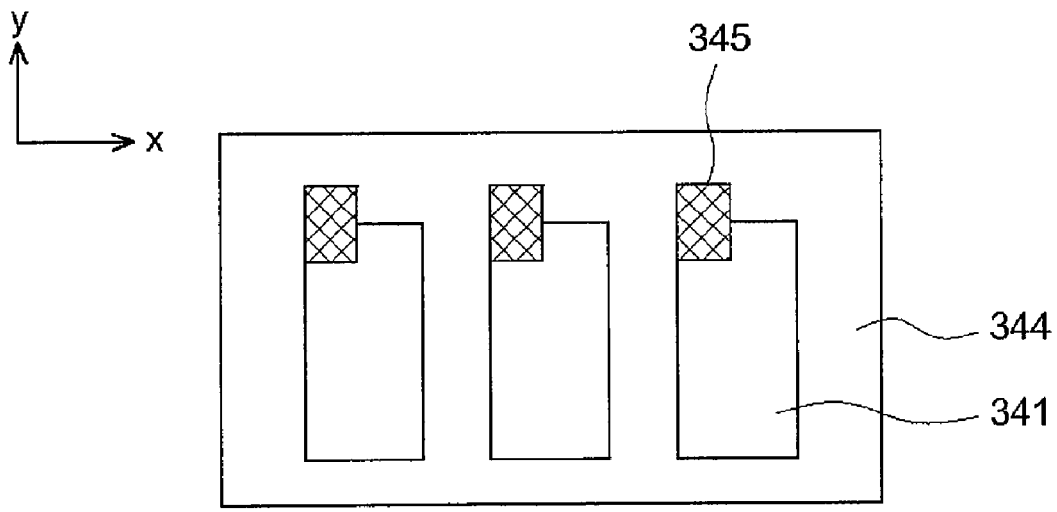
FIG. 6 shows a top view of the color filter substrate of FIG. 5.

FIG. 6 shows a top view of the color filter substrate 320 of FIG. 5. The anti-reflection layer 345 covers the part of the conducting material layer 344 opposite to the TFT 311 as indicated in FIG. 5. Thus, current leakage is significantly reduced, since the light will not act on the TFT.

Figure 7:
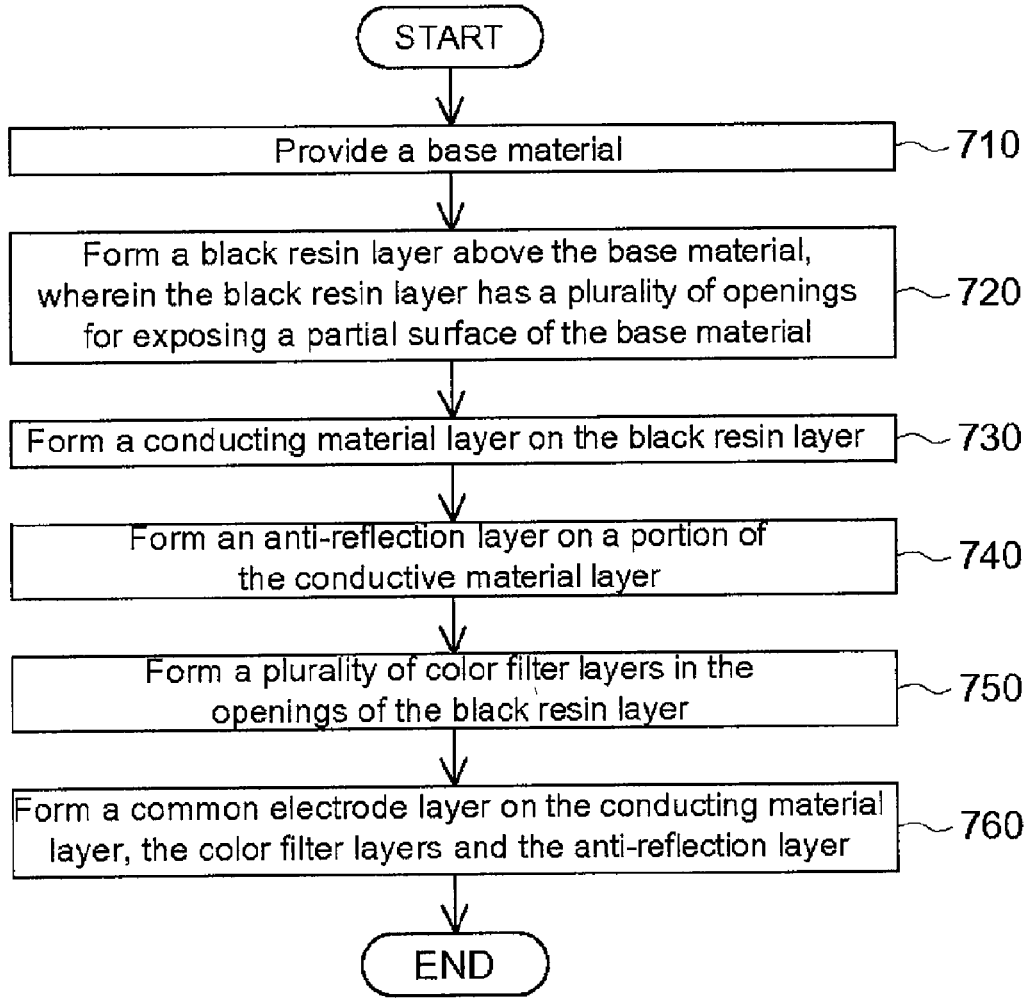
FIG. 7 shows a flowchart of a method for manufacturing the color filter substrate of FIG. 5.

A method for manufacturing a color filter substrate is described below in connection with an accompanying flowchart. Reference is made to both FIG. 5 and FIG. 7. FIG. 7 shows a flowchart of a method for manufacturing the color filter substrate 320. First, a base material 330 is provided (step 710). Next, a black resin layer 343 is formed on the base material 330 (step 720), wherein the black resin layer 343 has a plurality of openings 343a for exposing a partial surface of the base material 330. Then, a conducting material layer 344 is formed on the black resin layer 343 (step 730). After that, an anti-reflection layer 345 is formed on a part of the conducting material layer 344 (step 740).

In the present embodiment, the anti-reflection layer 345 is disposed opposite to the TFT 311 so that the light will not reflect to the TFT 311. Then, a plurality of color filter layers 341 is formed in the openings 343*a* of the black resin layer 343 (step 750). Lastly, a common electrode layer 350 is formed on the conducting material layer 344, the color filter layers 341 and the anti-reflection layer 345 (step 760).

The LCD panel 300 has the following characteristics. The anti-reflection layer 345 is disposed on the conducting material layer 344 and disposed in alignment with the TFT 311

According to the color filter substrate and method for manufacturing the same, and the LCD panel using the same disclosed in the above embodiments, the conducting material layer directly contacts the common electrode layer to increase the conducting area and take away the charges accumulated on the common electrode layer. This results in a corresponding reduction in the sheet resistance of the electrode layer, thereby improving the display quality of the LCD panel. In addition, current leakage occurs when the light reflecting from the conducting material layer acts on the TFT. Therefore, removing the part of the conducting material layer opposite to the TFT will reduce the light reflected by the conducting material layer acting on the TFT. Or, forming the anti-reflection layer above the part of the conducting material layer opposite to the TFT will avoid the light directly acting on the TFT. The method of separating the TFT from the light avoids current leakage occurring to the TFT during the photo-electro conversion. Moreover, the use of black resin layer reduces reflection rate and costs.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
    a thin film transistor (TFT) substrate having a plurality of TFTs;
    a color filter substrate, comprising:
    a base material;
        a filter structure, comprising:
        a sheltering matrix disposed above the base material and comprising:
            a black resin layer having a plurality of openings for exposing a partial surface of the base material; and
            a conducting material layer disposed on the black resin layer; and
        a plurality of color filter layers disposed in the plurality of openings of the black resin layer; and
        a common electrode layer disposed on the filter structure; and
    a liquid crystal layer disposed between the TFT substrate and the color filter substrate,
    wherein the conducting material layer of the sheltering matrix has a plurality of gaps for exposing a part of the black resin layer, and the gaps are opposite to the plurality of TFTs.

2. The LCD panel according to claim 1, wherein the common electrode layer directly contacts the conducting material layer of the sheltering matrix.

3. The LCD panel according to claim 1, wherein the common electrode layer is made from indium tin oxide (ITO).

4. The LCD panel according to claim 1, further comprises an anti-reflection layer disposed on the plurality of gaps.

5. The LCD panel according to claim 4, wherein the anti-reflection layer is made from chromium oxide.

6. The LCD panel according to claim 1, wherein the conducting material layer is made from metal.

7. The LCD panel according to claim 6, wherein the conducting material layer is made from chromium or aluminum.

8. The LCD panel according to claim 1, wherein the base material is a transparent glass substrate.

9. A method for manufacturing a liquid crystal display (LCD) panel, comprising:
    providing a thin film transistor (TFT) substrate having a plurality of TFTs;
    providing a color filter substrate;
    forming a black resin layer above the color filter substrate, wherein the black resin layer has a plurality of openings for exposing a partial surface of the color filter substrate;
    forming a conducting material layer on the black resin layer;
    removing a plurality of portions of the conducting material layer for exposing a plurality of parts of the black resin layer, wherein the removed portions of the conducting material layer are opposite to the plurality of TFTs;
    forming a plurality of color filter layers in the plurality of openings of the black resin layer; and
    forming a common electrode layer on the conducting material layer and the plurality of color filter layers.

\* \* \* \* \*